United States Patent
Stevens et al.

(10) Patent No.: US 12,549,549 B1
(45) Date of Patent: Feb. 10, 2026

(54) INTERNET OF THINGS (IOT) SYSTEMS AND METHODS

(71) Applicant: CABLE TELEVISION LABORATORIES, INC., Louisville, CO (US)

(72) Inventors: Clarke Stevens, Parker, CO (US); Brian A. Scriber, Lafayette, CO (US); Andrew Alexander Dolan, Denver, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 30 days.

(21) Appl. No.: 18/773,303

(22) Filed: Jul. 15, 2024

Related U.S. Application Data

(60) Division of application No. 17/397,381, filed on Aug. 9, 2021, now Pat. No. 12,041,049, which is a
(Continued)

(51) Int. Cl.
  *G06F 7/04* (2006.01)
  *G16Y 30/10* (2020.01)
  (Continued)

(52) U.S. Cl.
  CPC .......... *H04L 63/0876* (2013.01); *G16Y 30/10* (2020.01); *H04W 12/06* (2013.01); *H04L 63/18* (2013.01)

(58) Field of Classification Search
  CPC ... H04L 63/18; H04L 63/0869; H04L 9/3273; H04L 9/3215; H04L 9/3235; G06F 21/42; G06F 21/445; H04W 12/06
  See application file for complete search history.

(56) References Cited

U.S. PATENT DOCUMENTS

| | | |
|---|---|---|
| 8,051,489 B1 | 11/2011 | Montenegro |
| 8,422,401 B1 | 4/2013 | Choong et al. |
| | (Continued) | |

OTHER PUBLICATIONS

Sethi et al, Secure and Low-Power Authentication for Resource Devices, Oct. 28, 2015, IEEE, pp. 30-36. (Year: 2015).*
(Continued)

*Primary Examiner* — Philip J Chea
*Assistant Examiner* — Jenise E Jackson
(74) *Attorney, Agent, or Firm* — Cozen O'Connor

(57) ABSTRACT

In some implementations, a network onboarding system may receive, over a first connectivity protocol, a uniform resource identifier (URI) for an IoT device. The network onboarding system may authenticate, over the first connectivity protocol, the IoT device based on the URI. The network onboarding system may exchange, with the IoT device, over the first connectivity protocol, a set of IoT device credentials with a set of onboarding credentials for an IoT network. The network onboarding system may configure a notify message that includes the IoT device credentials for transmission over a second connectivity protocol. The network onboarding system may perform, by the network onboarding system, a filtered discovery of the IoT device over the second connectivity protocol. The network onboarding system may onboard, over the second connectivity protocol, the IoT device onto the IoT network.

17 Claims, 11 Drawing Sheets

Related U.S. Application Data continuation-in-part of application No. 17/244,865, filed on Apr. 29, 2021, now Pat. No. 12,166,638.

(60) Provisional application No. 63/181,851, filed on Apr. 29, 2021, provisional application No. 63/180,510, filed on Apr. 27, 2021, provisional application No. 63/017,393, filed on Apr. 29, 2020.

(51) Int. Cl.
*H04L 9/40* (2022.01)
*H04W 12/06* (2021.01)

(56) References Cited

U.S. PATENT DOCUMENTS

| | | | |
|---|---|---|---|
| 10,574,654 B1 | 2/2020 | Schroeder et al. | |
| 2004/0158780 A1 | 8/2004 | Conrad | |
| 2011/0302201 A1 | 12/2011 | Ogaz et al. | |
| 2014/0094124 A1 | 4/2014 | Dave et al. | |
| 2014/0181279 A1 | 6/2014 | Louis et al. | |
| 2015/0032867 A1 | 1/2015 | Lihosit et al. | |
| 2015/0130957 A1 | 5/2015 | Berelejis et al. | |
| 2016/0212099 A1 | 7/2016 | Zou et al. | |
| 2017/0201585 A1 | 7/2017 | Doraiswamy et al. | |
| 2017/0257767 A1 | 9/2017 | Zhao et al. | |
| 2018/0115611 A1 | 4/2018 | Lear et al. | |
| 2018/0183790 A1 | 6/2018 | Likar | |
| 2018/0270231 A1 | 9/2018 | Bauer et al. | |
| 2019/0044948 A1 | 2/2019 | Beals | |
| 2019/0098091 A1 | 3/2019 | Shinde et al. | |
| 2019/0306710 A1* | 10/2019 | Cammarota | H04W 12/06 |
| 2019/0370401 A1 | 12/2019 | Grant et al. | |
| 2020/0067938 A1 | 2/2020 | Smith et al. | |
| 2020/0145409 A1* | 5/2020 | Pochuev | H04L 63/0853 |
| 2020/0177589 A1* | 6/2020 | Mangalvedkar | H04W 4/50 |
| 2020/0195504 A1* | 6/2020 | Tao | H04W 24/10 |
| 2020/0221296 A1* | 7/2020 | Jiang | H04L 63/0869 |
| 2020/0267543 A1 | 8/2020 | Byers et al. | |
| 2020/0275273 A1 | 8/2020 | Smith et al. | |
| 2020/0288540 A1 | 9/2020 | Chu et al. | |
| 2020/0372700 A1 | 11/2020 | Davies | |
| 2020/0374700 A1 | 11/2020 | Smith et al. | |
| 2021/0099349 A1 | 4/2021 | Lee et al. | |
| 2021/0218793 A1 | 7/2021 | Abe et al. | |
| 2022/0037041 A1 | 2/2022 | Nelson et al. | |
| 2022/0201473 A1* | 6/2022 | Alpert | H04W 88/16 |
| 2022/0294623 A1* | 9/2022 | Yu | H04L 9/0869 |
| 2022/0303282 A1 | 9/2022 | Barriga et al. | |
| 2022/0400118 A1* | 12/2022 | Jiang | G06F 21/45 |

OTHER PUBLICATIONS

Zegeye et al, Authentication of IoT Devices for WiFi Connectivity from the Cloud, Mar. 22, 2019, IEEE, pp. 1-6. (Year: 2019).*

Farooq et al., IoT-Connect: An Interoperability Framework for Smart Home Communication Protocols, IEEE, Dec. 4, 2019, pp. 22-29. (Year: 2019).

Open Connectivity Foundation (OCF), OCF Streamlined Onboarding Specification 0.0.1., Jan. 2021, pp. 1-18. (Year: 2021).

Shang et al., Breaking out the Cloud: Local Trust Management and Rendezvous in Named Data Networking of Things, IEEE, Apr. 21, 2017, pp. 3-13. (Year: 2017).

* cited by examiner

INTERNET OF THINGS (IOT) SYSTEMS AND METHODS

RELATED APPLICATIONS

This application is a divisional application of U.S. patent application Ser. No. 17/397,381, filed Aug. 9, 2021. U.S. patent application Ser. No. 17/397,381 is a continuation-in-part of U.S. patent application Ser. No. 17/244,865, filed Apr. 29, 2021, which application claims priority to U.S. Patent Application Ser. No. 63/017,393, filed Apr. 29, 2020, and U.S. Patent Application Ser. No. 63/180,510, filed Apr. 27, 2021. U.S. patent application Ser. No. 17/397,381 also claims priority to U.S. Patent Application Ser. No. 63/181,851, filed Apr. 29, 2021. All of the aforementioned applications are incorporated herein by reference in their entireties.

BACKGROUND

The Internet-of-Things (IoT) is a system of interrelated computing devices, mechanical, and digital machines provided with unique identifiers and the ability to transfer data over a network without requiring human-to-human or human-to-computer interaction.

The definition of the Internet-of-Things has evolved due to the convergence of multiple technologies, real-time analytics, machine learning, commodity sensors, and embedded systems. Traditional fields of embedded systems, wireless sensor networks, control systems, automation (including home and building automation), and others all contribute to enabling the Internet-of-Things. In the consumer market, IoT technology is most synonymous with products pertaining to the concept of the "smart home", covering devices and appliances (such as lighting fixtures, thermostats, home security systems and cameras, and other home appliances) that support one or more common ecosystems, and can be controlled via devices associated with that ecosystem, such as smartphones and smart speakers.

SUMMARY

In some implementations, a method may include the network onboarding system receiving, over a first connectivity protocol, a uniform resource identifier (URI) for an IoT device. The method may further include the network onboarding system authenticating over the first connectivity protocol, the IoT device based on the URI. The method may further include exchanging, between the network onboarding system and the IoT device, over the first connectivity protocol, a set of IoT device credentials with a set of onboarding credentials for an IoT network. The method may further include the network onboarding system configuring a notify message that includes the IoT device credentials for transmission over a second connectivity protocol. The method may further include the network onboarding system performing system a filtered discovery of the IoT device over the second connectivity protocol. The method may further include the network onboarding system onboarding, over the second connectivity protocol, the IoT device onto the IoT network.

In some implementations, a network onboarding system includes at least one processor and a memory communicatively coupled with the at least one processor and stores machine readable instructions that, when executed by the processor, cause the processor to receive, over a first connectivity protocol, a uniform resource identifier (URI) for an IoT device. The network onboarding system further authenticates the IoT device based on the URI. The network onboarding system further exchanges, with the IoT device, a set of IoT device credentials with a set of onboarding credentials for an IoT network. The network onboarding system further configures a notify message that includes the IoT device credentials for transmission over a second connectivity protocol. The network onboarding system further performs a filtered discovery of the IoT device. The network onboarding system further onboards, over the second connectivity protocol, the IoT device onto the IoT network.

In some implementations, an Internet-of-Things (IoT) onboarding system includes a diplomat configured to communicate over a first connectivity protocol and over a second connectivity protocol. The IoT onboarding system further incudes a configurator implemented within the first connectivity protocol, the configurator is configured to communicate over the first connectivity protocol with the diplomat, and further configured to provision IoT devices and act as an intermediary, passing data between the IoT device and the diplomat. The onboarding system further includes an onboarding application configured to communicate over the second connectivity protocol with the diplomat and to onboard IoT devices onto an IoT ecosystem.

DETAILED DESCRIPTION OF THE EMBODIMENTS

Figure 1:
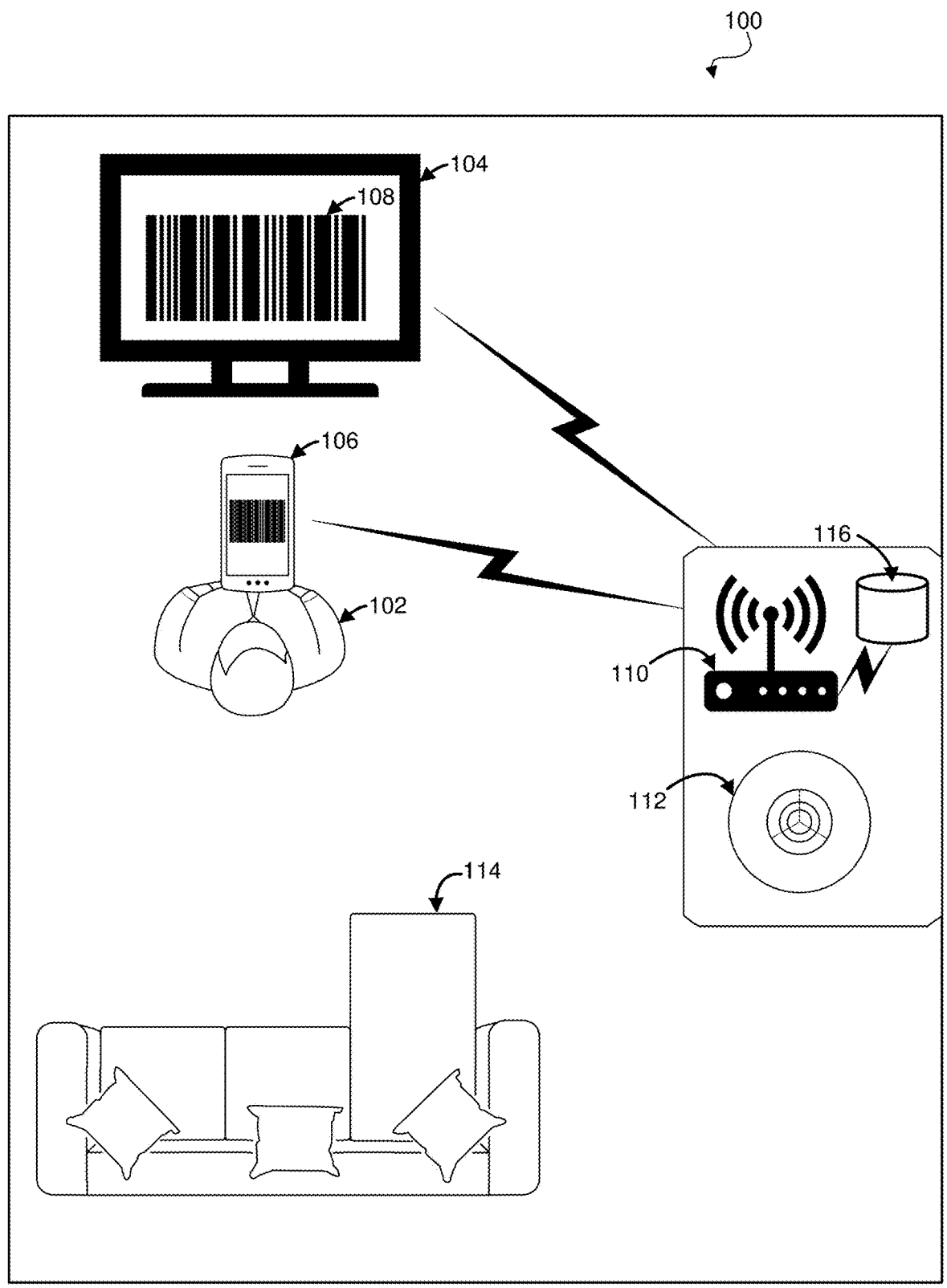
FIG. 1 shows one example at-home IoT ecosystem that includes a set of IoT devices and an IoT device to be onboarded to the IoT ecosystem, including a desired device, according to embodiments.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

One of the challenges of the Internet-of-Things (IoT) is that there are many devices connected to a network from various vendors that are not compatible. Sometimes, this problem can be resolved by hardware that bridges between physical network protocols and software that maps between various data models. However, the sheer number of devices and permutations available on the market makes it nearly impossible for an average customer to sort this out. This causes people to buy IoT devices with the hope to integrate it to their home-IoT ecosystem, however, the customer cannot use or figure out how to use the device, and returns the device. This results in dissatisfied customers, increased product chain cost, lost revenue, and bad publicity. Embodiments of the present disclosure provide a response to worldwide demand for smart home-focused IoT devices, such as appliances, door locks, security cameras, sensors, and actuators, which can be modelled and controlled, locally and remotely, over an internet protocol network.

While some inter-device communication exists, currently, no universal language has been developed for IoT device manufacturers to choose from between disparate IoT-ecosystem frameworks, limiting their market share to specific IoT frameworks, or developing across multiple ecosystems, thereby increasing their costs. This creates a burden that falls on consumers to determine whether the products they desire are compatible with the IoT ecosystem of a particular IoT device, or find a way to integrate their IoT device into their IoT ecosystem, and try to troubleshoot interoperability issues manually.

In addition to smart-home IoT ecosystems, IoT deployments in commercial environments are hampered by a lack of security. This issue can be avoided by having a secure IoT communication framework, which embodiments of the present disclosure solve. Embodiments of the present disclosure describe a method and system of connecting devices for the Internet-of-Things, providing secure and reliable IoT-device discovery and connectivity across multiple operating systems and platforms. Currently, no single solution exists that addresses the majority of key requirements of secure and reliable discovery and connectivity across operating systems (e.g., an out-of-band channel, which is data transfer using a communication channel other than the WLAN, such as device provisioning protocol, etc.) and platforms (e.g., an IoT ecosystem). Provisioning can include securely enabling a device to establish secure associations with other devices in a network. Embodiments of the present disclosure describe a method and system enable industry consolidation around a common, secure, interoperable approach to this issue. For example, there is a need for a system or computing unit that can communicate across multiple connectivity protocols, such as Wi-Fi and an IoT ecosystem, for seamless and automatic onboarding of IoT devices to the IoT ecosystem.

The Internet of Things (IoT) is a system of interrelated computing devices, mechanical and digital machines provided with unique identifiers and the ability to transfer data over a network without requiring human-to-human or human-to-computer interaction.

The definition of the Internet of Things has evolved due to the convergence of multiple technologies, real-time analytics, machine learning, commodity sensors, and embedded systems. Traditional fields of embedded systems, wireless sensor networks, control systems, automation (including home and building automation), and others all contribute to enabling the Internet of Things. In the consumer market, IoT technology is most synonymous with products pertaining to the concept of the "smart home", covering devices and appliances (such as lighting fixtures, thermostats, home security systems and cameras, and other home appliances) that support one or more common ecosystems, and can be controlled via devices associated with that ecosystem, such as smartphones and smart speakers.

Embodiments of the present disclosure may be utilized in any IoT ecosystem. The present disclosure discusses the embodiments within, and of, the Open Connectivity Foundation® (OCF), and uses terms associated with OCF, specifically device provisioning protocol (DPP) architecture and terms associated therewith, such as configurator. This language does not exclude other IoT ecosystems from the purview of this disclosure. Some software or hardware may be included in this disclosure but embodiments, in practice, may not require the software or hardware, or only parts thereof. For example, a logical entity, such as the configurator, may be included in the disclosure to perform certain steps, but is not required in practice. Any step disclosed may not be necessarily required in practice.

FIG. 1 shows one example IoT ecosystem 100, where a user 102 has recently purchased an IoT device 104 (e.g., an IoT television) to add to the IoT ecosystem 100, which includes an IoT recliner 114 and an IoT lamp 112. The IoT device 104 may present an identifier (e.g., a QR code 108 within the screen of the IoT device 104), having IoT device credentials and a universal unique identifier (UUID) embedded. A client device 106 (e.g., a smart phone) may capture the identifier (e.g., by capturing a digital image of the QR code 108). The client device 106 may be wirelessly connected to a wireless router 110 and transmit, over a first connectivity protocol, the captured digital image of the QR code 108 to a configurator (not shown) residing within the first connectivity protocol. In some embodiments, the first connectivity protocol may be a device provisioning protocol (DPP). Transmitting the QR code 108 may begin an onboarding process that onboards the IoT device 104 to the IoT ecosystem 100. The onboarding process may be facilitated by an onboarding application (not shown) accessible within the client device 106. In some embodiments, a diplomat 116 is wirelessly connected to the wireless router 110 and facilitates communication over both the first connectivity protocol, with the configurator, and the second connectivity protocol, with the onboarding application.

Figure 2:
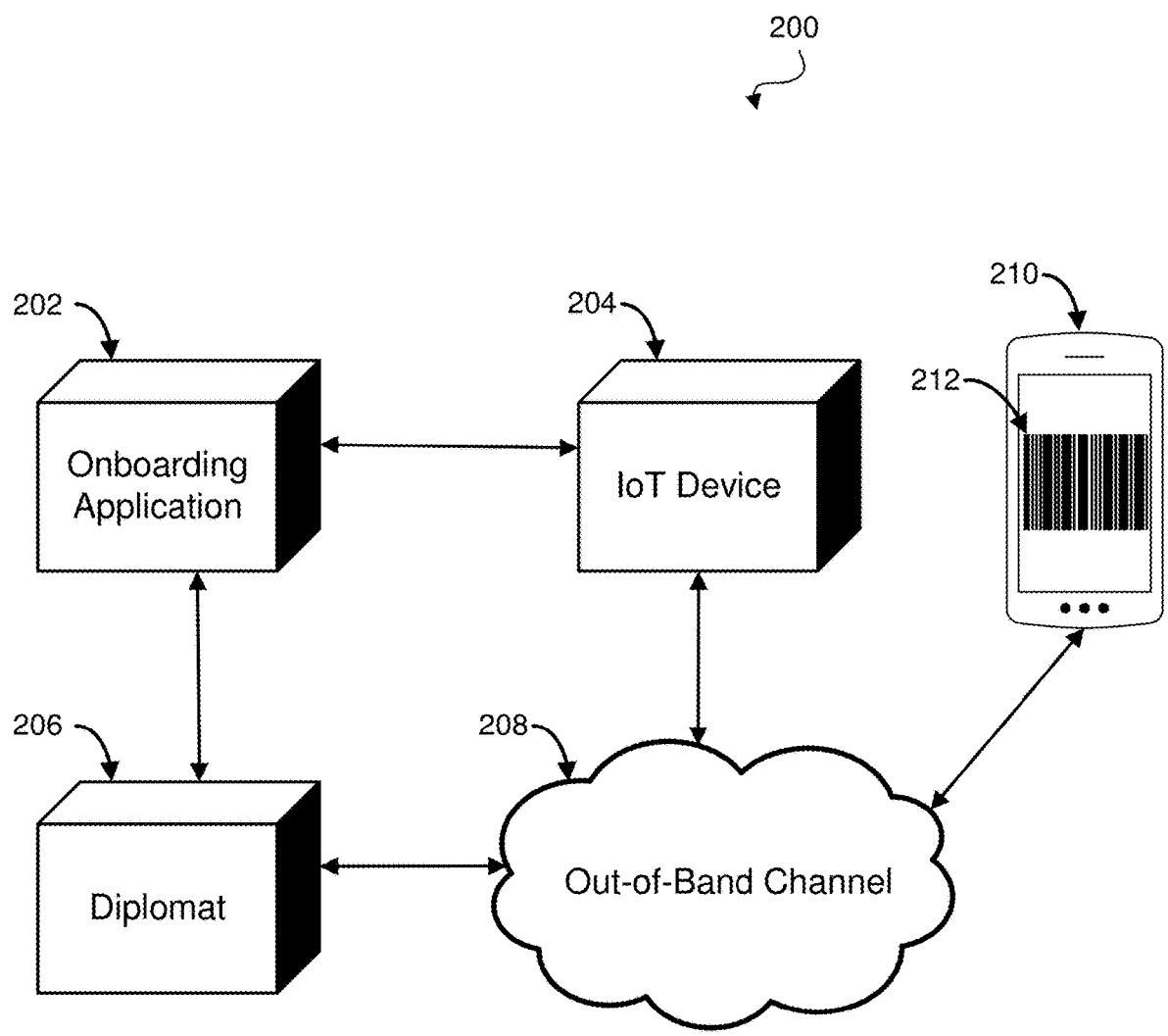
FIG. 2 shows one example network onboarding system, including an onboarding application, an out-of-band channel, and a diplomat, used to onboard the IoT device to an ecosystem, according to embodiments.

FIG. 2 shows one example network onboarding system 200 wirelessly connected with an IoT device 204 (e.g., the IoT device 104, FIG. 1). The network onboarding system may include an onboarding application 202, a diplomat 206, and an out-of-band channel 208. In some embodiments, the diplomat 206 may act as a translator between the IoT device 204, over the out-of-band channel 208 (e.g., Wi-Fi, etc.), that the IoT device 204 may connect with upon activation; and the onboarding application 202, that the diplomat 206 may wirelessly communicate with over a second connectivity protocol (e.g., an IoT network, such as Wi-Fi, Bluetooth, or cellular, depending on the application of the IoT device). The onboarding application 202 may facilitate onboarding of the IoT device 204 to the IoT ecosystem (e.g., the IoT ecosystem 100, FIG. 1). In some embodiments, the out-ofband (OOB) channel 208 may be any Wi-Fi protocol, such as the device provisioning protocol (DPP), as discussed in FIG. 3.

In some embodiments, the OOB channel 208 may receive a set of IoT device credentials from a client device 210 (e.g., the client device 106, FIG. 1), that were obtained from the client device 210 capturing an identifier 212 (e.g., the QR code 108, FIG. 1) of the IoT device 204, and then scanning the identifier for the IoT device credentials.

Device provisioning protocol is known by those skilled in the art. This application incorporates by reference Wi-Fi Alliance Draft Provisioning Protocol Specification, Version 1.2.10 and Open Connectivity Foundation (OCF) Streamlined Onboarding Specification 0.0.1, which discuss the device provisioning protocol. In the DPP architecture, public keys (e.g., the public credential hashes for the IoT device and onboarding application) are used to identify and authenticate all devices. Private keys associated with a public key should be generated within each device and protected from disclosure. IoT devices may use public key cryptographic techniques to authenticate peer devices and establish shared keys for further secure communications. The DPP architecture simplifies the establishment of secure connectivity between devices and provides a foundation for improved usability in provisioning and connecting devices. This language does not exclude other embodiments or protocols from the purview of this disclosure. Provisioning allows the transfer of data and resources to/from the configurator from/to the IoT device. For example, provisioning allows the configurator to provide the onboarding credentials to the IoT device and the IoT device to provide the IoT credentials to the configurator.

Figure 3:
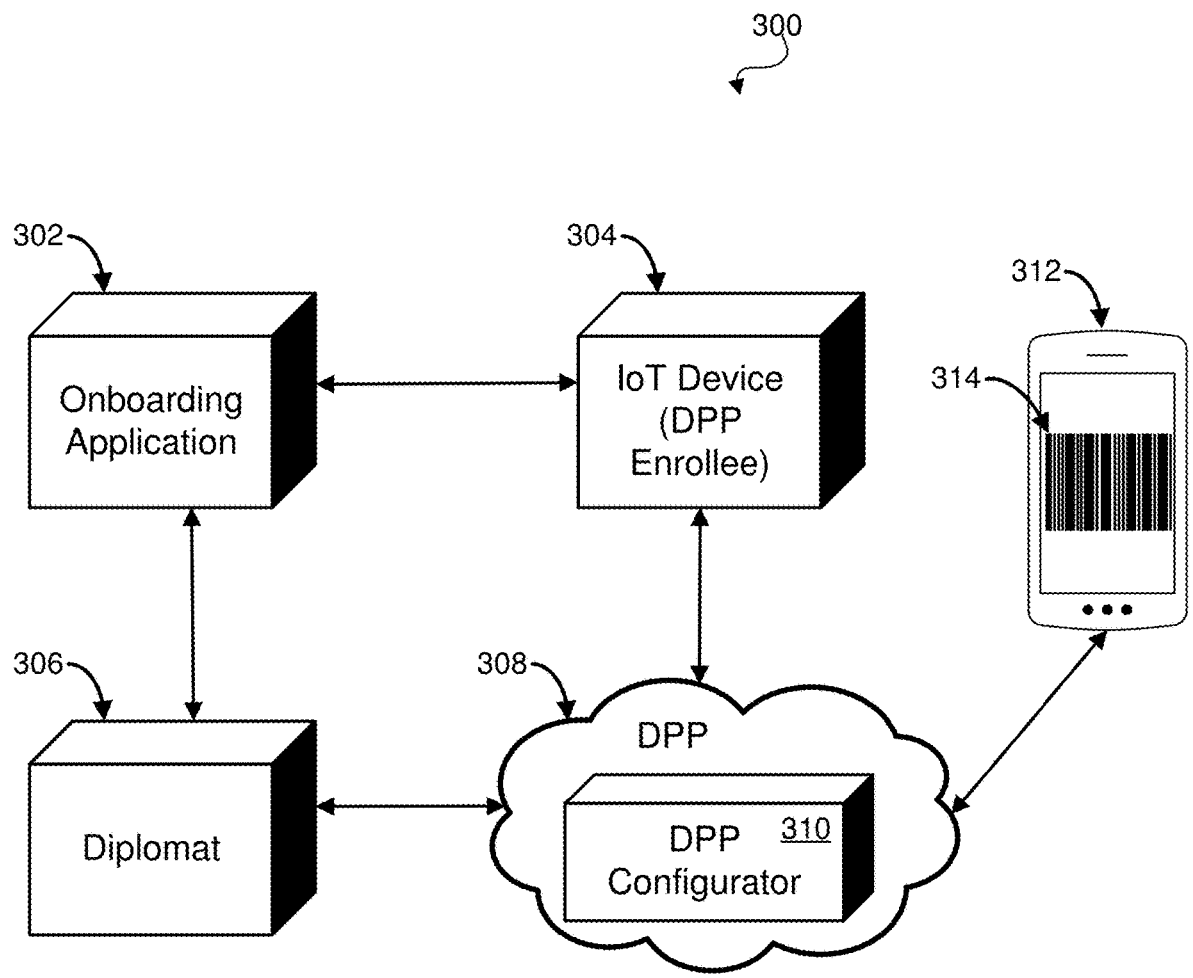
FIG. 3 shows one example network onboarding system, including an onboarding application, a device provisioning protocol (DPP), a DPP configurator, and a diplomat, used to onboard the IoT device to an ecosystem, according to embodiments.

FIG. 3 shows one example network onboarding system 300 wirelessly connected with an IoT device 304 (e.g., the IoT device 104, 204, FIGS. 1, 2, respectively). The network onboarding system may include an onboarding application 302, a diplomat 306, and a device provisioning protocol (DPP) 308, which includes a DPP configurator 310 for provisioning IoT devices to join the DPP and exchange necessary credentials for mutual authentication with the onboarding application 302. The DPP authentication protocol has a decentralized architecture with no central authority to coordinate or control authentication of a device. So, the DPP configurator 310 and the IoT device (also the diplomat 306 and the onboarding application 302) perform the necessary validation of the other to meet requirements of an exchange, using the public credentials hash and UUID.

The diplomat 306 includes machine readable instructions that, when executed by a processor, implement the functionality of the diplomat discussed herein. In some embodiments, the diplomat 306 is a specialized OCF resource type that performs diplomacy between the DPP 308 (OOB channel 208) and an OFC domain (e.g., the IoT ecosystem) with which it is associated and facilitates forwarding of information to/from the DPP 308 (OOB channel 208) to/from the onboarding application 302. The diplomat 306 represented in the form of an array of objects and within each object is a device ID (e.g., UUID) and a corresponding public credential for every IoT device within the IoT ecosystem. In some embodiments, the DPP configurator 310 is a logical entity that communicates with an IoT device 304 (DPP enrollee) and has capabilities to enroll and provision the IoT device 304, for device-to-device communication or infrastructure communication, with IoT network information and credentials necessary for onboarding the IoT device to the IoT network.

In some embodiments, the DPP 308 architecture may replace the OOB channel 208, FIG. 2. In some embodiments, any protocol architecture may be in place of the OOB channel that provides a connection between the IoT device 304 and the diplomat 306. In some embodiments, the diplomat 306 may act as a translator, communicating over two connectivity protocols: a first connectivity protocol (e.g., DPP) and a second connectivity protocol (IoT network). The diplomat 306 may communicate over the first connectivity protocol, through the DPP configurator, to the IoT device 304.

In embodiments, the DPP configurator provisions the IoT device. Provisioning may comprise four steps: bootstrapping, authentication, configuration, and access. First, the DPP configurator and the IoT device may exchange public credential hashes, over Wi-Fi, to establish a secure provisioning connection. Second, the devices may use the public credential hashes according to DPP authentication protocol to establish and trust a secure connection. Third, the configurator executes DPP configuration protocol to provision the IoT device over the secure channel established during DPP authentication. Lastly, the IoT device may use the newly provisioned credentials to establish network access. For example, DPP network introduction protocol may be used to establish keys for access to the network.

The DPP configurator 310 may forward onboarding credentials to the IoT device 304, received from the diplomat 306, so that the IoT device 304 may connect with the onboarding application 302. And the diplomat 306 may wirelessly communicate over an IoT network with the onboarding application 302 and transmit the IoT device credentials to the onboarding application 302. In other words, the diplomat 306 may communicate according to a first connectivity protocol (e.g., DPP 308) with the DPP configurator 310, to forward IoT device credentials, as well as over a second connectivity protocol (e.g., an IoT network for a particular IoT ecosystem), to communicate with the onboarding application 302 that resides on the IoT network. Because the OOB channel (DPP 308) can facilitate communication from the IoT device 304 to the DPP configurator 310 and communication from the diplomat 306 to the DPP configurator 310 then to the IoT device 304, the OOB channel (DPP 308) is capable of duplex communication.

In some embodiments, the DPP configurator 310 may receive a set of IoT device credentials from a client device 312 (e.g., the client device 106, FIG. 1), that were obtained from the client device 312 capturing an identifier 314 (e.g., the QR code 108, FIG. 1) of the IoT device 304, and then scanning the identifier for the IoT device credentials. In some embodiments, the IoT device credentials may include a UUID and a public credential hash of the IoT device 304. In some embodiments, the DPP configurator 310 may initiate a DPP exchange with the IoT device 304 (DPP enrollee), that includes first performing a DPP configuration exchange to associate the IoT device 304 with the DPP network. During the configuration exchange, the IoT device 304 provides IoT ecosystem credential information of the IoT device to the DPP configurator 310, and the DPP configurator 310 provides IoT ecosystem information about the onboarding application to the IoT device 304, which may be used for mutual authentication between the IoT device 304 and the onboarding application 302, as discussed below.

Figure 4:
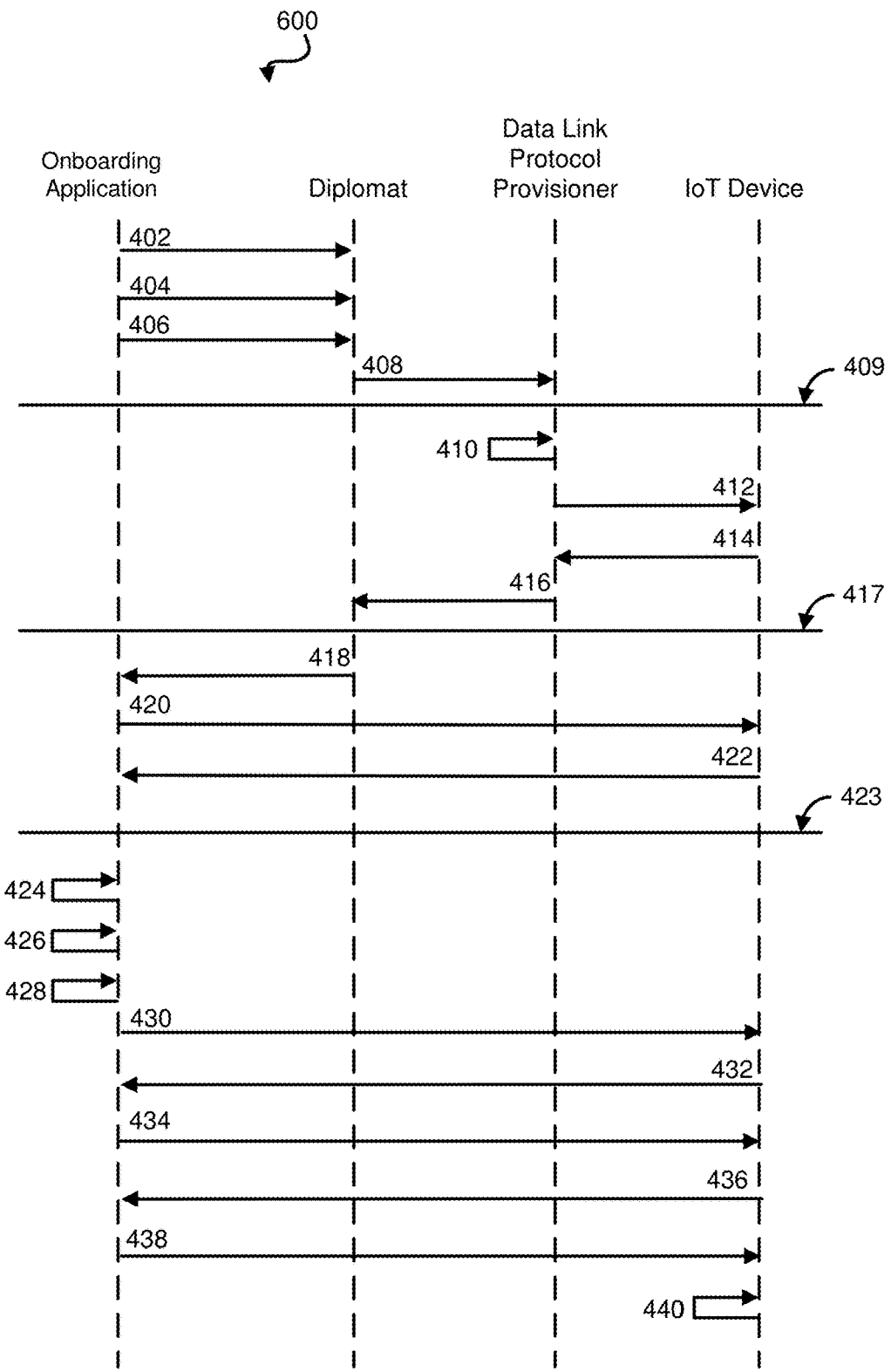
FIG. 4 shows one example sequence diagram for a network onboarding system onboarding an IoT device onto an IoT ecosystem, according to embodiments.

FIG. 4 shows a network onboarding sequence diagram 400 for onboarding an IoT device (e.g., IoT device 104, 204, 304, FIGS. 1, 2, 3) onto an IoT ecosystem (e.g., the IoT ecosystem 100, FIG. 1). FIG. 4 may be used with reference to FIG. 1, where a user is utilizing embodiments of the present disclosure to onboard the IoT device to the IoT ecosystem. Steps (402)-(408) outline bootstrapping and provisioning of the diplomat (e.g., diplomat 206, 305) onto the IoT ecosystem. For example, provisioning the diplomat to the IoT ecosystem will allow the onboarding application (e.g., the onboarding application 202, 302, FIGS. 2, 3) to be notified, by the diplomat, when an IoT device is attempting to join the IoT ecosystem. Prior to beginning the process of onboarding the IoT device, first, the onboarding application (e.g., onboarding application 202, 302) may initiate (402) onboarding of the diplomat (e.g., the diplomat 206, 305, FIGS. 2, 3, respectively) onto the IoT ecosystem. Onboarding will enable the onboarding application (e.g., onboarding application 202, 302) to subscribe to the diplomat (e.g., diplomat 206, 305) so that the onboarding application receives information regarding IoT devices (e.g., (e.g., IoT device 104, 204, 304) attempting to join the IoT ecosystem. Onboarding the diplomat may be in the form of resources associated with the diplomat populating a resource table (e.g., resource table 636, FIGS. 6, 7). In some embodiments, initiating the onboarding may be in response to receiving a confirmation, by the onboarding application, e.g., from a request by a user to onboard the diplomat, to onboard the diplomat.

The onboarding application may further provision (404) the access control entries of the diplomat to allow the onboarding application to observe any functionality of, or actions taken by, the diplomat. Onboarding the diplomat must occur so that the diplomat may provide notify messages to the onboarding application when an IoT device is attempting to join the IoT ecosystem, as discussed below. The diplomat is provisioned an access control entry specifying that the onboarding application may read the diplomat resource (e.g., the diplomat resources 712 within the resource table 636, FIGS. 6, 7). In some embodiments, resources are representations of a status, or actions taken by, an IoT device, diplomat, and/or any software or hardware device included within the IoT ecosystem. For example, the volume or brightness of an IoT TV, the brightness of an IoT lamp, the position of an IoT recliner, and whether the diplomat is providing, or has provided onboarding credentials to a, e.g., DPP configurator (e.g., the configurator 310, FIG. 3), all of which may be denoted as a resource.

The onboarding application may further transmit (406) a request for the onboarding application to observe the diplomat, indicating that the onboarding application has subscribed to the resource representing the diplomat. In some embodiments, subscribing may include receiving a notification when particular resources of the diplomat change. The diplomat may then provide (408) the UUID and public credential hash of the onboarding application to, e.g., the DPP configurator, so that the DPP configurator may forward the public credential hash of the onboarding application to the IoT device and used for mutual authentication between the IoT device and the onboarding application. In some embodiments, the diplomat may only share the public credential hash with the DPP configurator for when the onboarding application is confirmed to be online.

Steps (410)-(416) outline network association (409) of the IoT device. In some embodiments, the IoT device may begin initiation (410) of network onboarding association through a network onboarding protocol. In some embodiments, the DPP configurator may receive a signal, from a client device (e.g., the client device 106, 210, 312), to begin onboarding the IoT device to the network. Next, through a protocol-specific exchange of the network onboarding protocol, the DPP configurator may provide (412) the UUID and public credential hash of the onboarding application to the IoT device, in exchange for the IoT device providing (414) the DPP configurator with a UUID and public credential hash of the IoT device. The DPP configurator may then transmit (416) the received UUID and public credential hash of the IoT device to the diplomat.

Steps (418)-(422) outline IoT ecosystem discovery (417). The diplomat transmits (418) a notify message, over the IoT network, to the onboarding application because the onboarding application has subscribed to the diplomat. The notify message indicates that an IoT device is requesting to join the IoT ecosystem and includes the UUID and the public credentials hash of the IoT device. In response to receiving the notify message from the diplomat, the onboarding application performs (420) multicast discovery, leveraging the UUID of the device as a query parameter to the discovery. The IoT device may then respond (422) to the multicast discovery.

Steps (424)-(440) outline a streamlined ownership transfer method (423). After the onboarding application receives a response from the IoT device, the onboarding application may prompt (424) a request for a confirmation to proceed with onboarding the IoT device onto the IoT ecosystem, which may be associated with the IoT ecosystem and have managerial control over the IoT ecosystem. The request may be in the form of a prompt within the client device. The onboarding application will either receive a response that rejects (426) or accepts (428) onboarding the IoT device onto the IoT ecosystem. In some embodiments, the client device may be operated by a user (e.g., user 102, FIG. 1) who purchased the IoT device and began the onboarding process by scanning the identifier (e.g., the QR code 108, FIG. 1) with the client device (e.g., client device 106, FIG. 1).

If the onboarding application receives an acceptance to begin onboarding the IoT device into the IoT ecosystem, the onboarding device may initiate (430) streamlining of an ownership transfer method, in which ownership of the IoT device transfers to the IoT ecosystem. The initiation of the ownership transfer method may include a transport layer security (TLS) handshake (432) between the onboarding application and the IoT device. The TLS handshake may include the onboarding application authenticating the IoT device by referencing the public credentials hash of the IoT device, that the onboarding application received from the diplomat; and the IoT device authenticating the onboarding application by referencing the public credential hash of the onboarding application, that the IoT device received from the DPP configurator.

Upon completion of a TLS handshake, the onboarding application may provision (434) ownership credentials of the IoT device to the IoT ecosystem. Upon provisioning ownership of the IoT device to the IoT ecosystem, the onboarding may be complete (436). However, if the client device rejects (428) the request, from the onboarding application, to onboard the IoT device into the IoT ecosystem, the onboarding application may request (438) that the IoT device reset and return to a status before the onboarding application initiated (430) the ownership transfer method, to allow for subsequent onboarding with a different method. After the onboarding application requests that the IoT device reset and return to a status before initiation of the onboarding method, the IoT device (440) may self-reset to the status before initiation.

Figure 5:
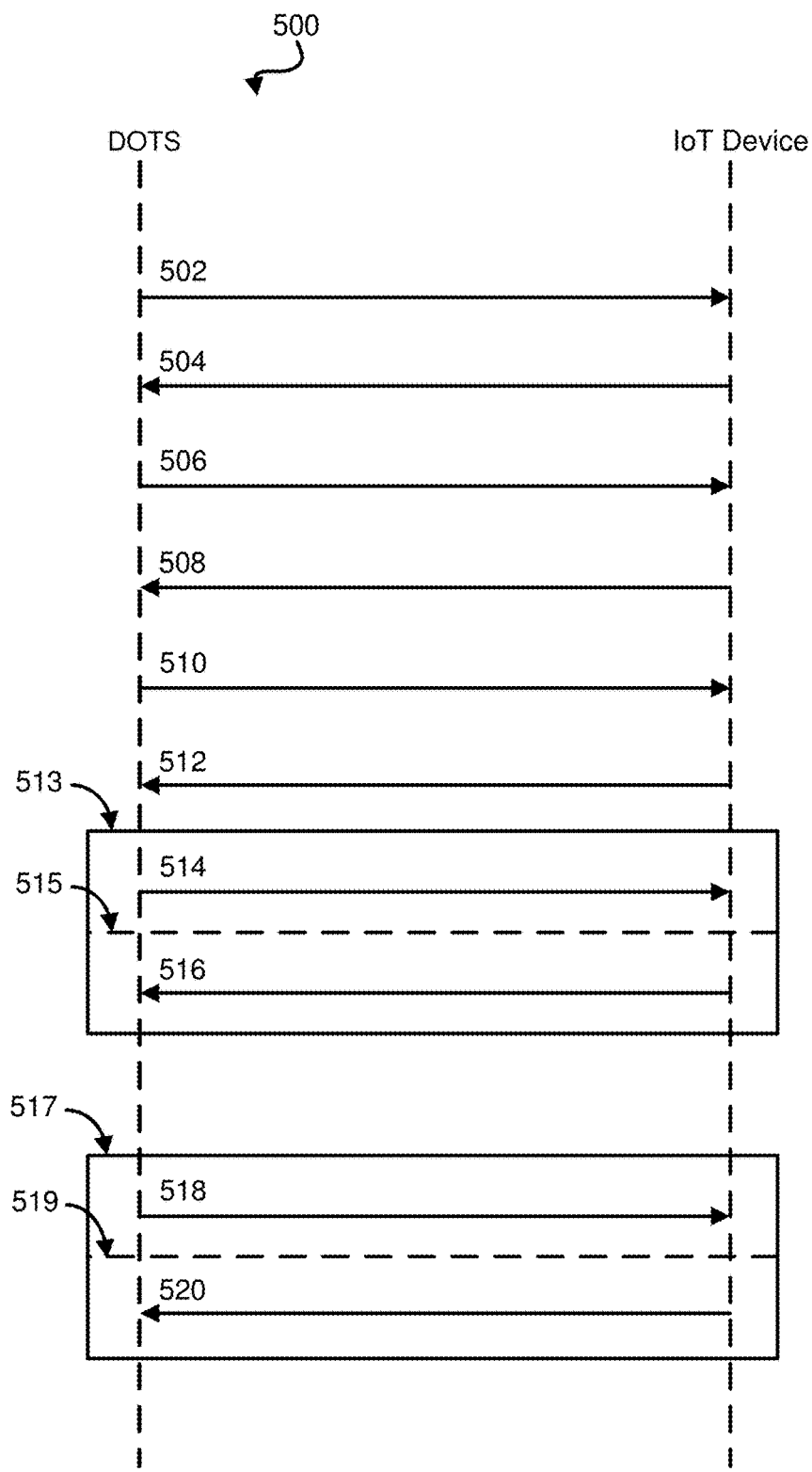
FIG. 5 shows one example sequence diagram for an ownership transfer method between an onboarding application and an IoT device, according to embodiments.

FIG. 5 shows a streamlined ownership transfer diagram 500 of the onboarding application (e.g., the onboarding application 202, 302, FIGS. 2, 3) onboarding the IoT device (e.g., the IoT device 104, 204, 304, FIGS. 1-3) into the IoT ecosystem (e.g., the IoT ecosystem 100, FIG. 1). FIG. 5 may be read with reference to (430)-(436), FIG. 4, after receiving an acceptance (428), from the client device (e.g., the client device 106, 210, 312, FIGS. 1-3). Further, and as shown in (412) and (414), before the ownership transfer diagram begins, the onboarding application is in possession of the UUID and public credentials of the IoT device, after the diplomat (e.g., the diplomat 206, 306, FIGS. 2, 3) transmits the UUID and the public credentials of the IoT device to the onboarding application. Further, the IoT device is in possession of the UUID and public credentials of the onboarding application, after receiving, from the DPP configurator (e.g., DPP configurator 310, FIG. 3) the UUID and public credentials of the of the onboarding application. In some embodiments, the ownership transfer method begins before the IoT device and the onboarding application have exchanged the public credential hashes of both the IoT device and the onboarding application.

The streamlined ownership transfer diagram 500 may begin with the onboarding application notifying (502) the IoT device that the onboarding application has received a request to accept (504), e.g., from a client device, to proceed with streamlining the onboarding of the IoT device. The request from the client device may be an automatic request to proceed with streamlining the onboarding of the IoT device, or in response to a user (e.g., user 102, FIG. 1) selecting to proceed with the streamlining, etc. The onboarding application may initiate (506) the TLS handshake with the IoT device, and the IoT device may request (508) the UUID and public credential hash of the onboarding application, from the onboarding application. Next, the IoT device may provide (510) its UUID and public credential hash to the onboarding application, and the onboarding application may verify (512) the UUID and public credential hash of the IoT device.

As shown in FIG. 5, the onboarding application authenticates (513) the IoT device. The onboarding application may extract (514) the public credential hash provided by the IoT device and compute the public credential hash. Further, the onboarding application may compare the computed, public credential hash to the hash that the onboarding application received (418, FIG. 4) by the diplomat, within the notify message, from the DPP configurator, over the OOB channel (e.g., the OOB channel 208 or DPP 308, FIGS. 2, 3, respectively), initially from the IoT device. If the public credential hash received from the diplomat does not match with the public credential hash received from the IoT device, over the IoT network, the onboarding application may return (515) an error and close the DTLS connection with the IoT device. Otherwise, the onboarding application continues (516) with the TLS handshake and provides the public credential hash of the onboarding application to the IoT device.

As shown in FIG. 5, the IoT device authenticates (517) the onboarding application. The IoT device may extract (518) the public credential hash provided by the onboarding application, compute the public credential hash, and then compare the computed public credential hash with the public credential hash that the IoT device received (416, FIG. 4), over the OOB channel, from the DPP configurator. If the compared hashes do not match, the IoT device returns (519) an error and closes the DTLS connection with the onboarding application. However, if the hashes do match, the IoT device completes (520) the TLS handshake with the onboarding application.

Figure 6:
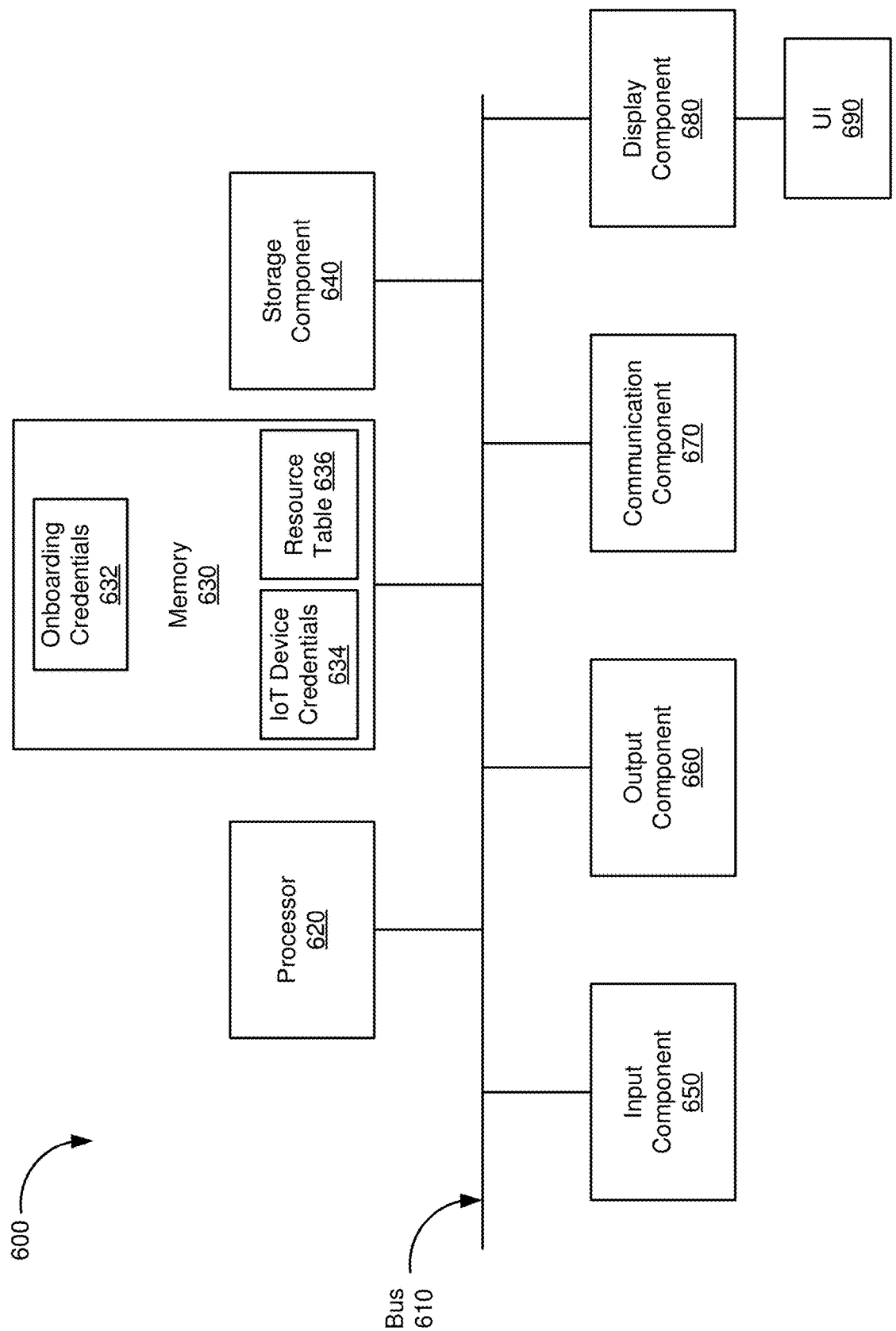
FIG. 6 shows one example computing diagram, that may be enabled on a client device, in the cloud, or on an IoT ecosystem, according to embodiments.

FIG. 6 shows an exemplary computing device 600 (e.g., the client device 106, 210, 312, FIGS. 1-3, respectively), that includes a bus 610 that may provide communication between any of processor 620, memory 630, storage component 640, input component 650, output component 660, communication component 670, display component 680, and user interface (UI) 690. In some embodiments, the computing device 600 is a server, remote computing device, or the components are physically separate from each other. For example, the memory 630 may be on a remote server and the remaining components are on a client device (e.g., the client device 106, 210, 312). Processor 620 may be a programmable central processing unit capable of executing instructions stored in memory 630 for analyzing both the onboarding credentials 632 and IoT device credentials 634.

The memory 630, onboarding credentials 632, IoT device credentials 634, and resource table 636 may also reside within the storage component 640 for longer-term storage. In some embodiments, storage component 640 may reside on an IoT ecosystem and include the resource table 636 (discussed herein). The diplomat is partly represented in the form of resources within the resource table 636 and the onboarding application may be subscribed to any of the resources within the resource table, including the diplomat resources, discussed below. In some embodiments, the resource table 636 may be located within the memory 630 of a, e.g., client device, cloud network, and/or on an IoT ecosystem. Input component 650 may receive an identifier of an IoT device (e.g., IoT device 104), e.g., in the form of a scanned digital image of the identifier taken with a camera embedded within the client device (e.g., the client device 106) and then output the scanned identifier, by the output component 660, to, e.g., a configurator (not shown) (e.g., the DPP configurator 310, FIG. 3). In some embodiments, the input component 650 may receive the identifier from the identifier of the IoT device in the form of a Bluetooth signal, nearfield communication signal, etc., from the client device, and the output component 660 may output any of those identifiers to the configurator.

Communication component 670 may communicate either, or both, physically and wirelessly with other computing devices, e.g., any of the IoT devices 104, 112, 114. In some embodiments, the communication component 670 may transmit the identifier from the output component 650 to the input component 660. Display component 680 may provide one or more connections for one or more display devices. For example, the display component 680 may output a digital image of the identifier and the corresponding IoT device within the UI 690 of the client device, as an option for the, e.g., user 102, to select onboarding of the IoT device to the IoT ecosystem.

Figure 7:
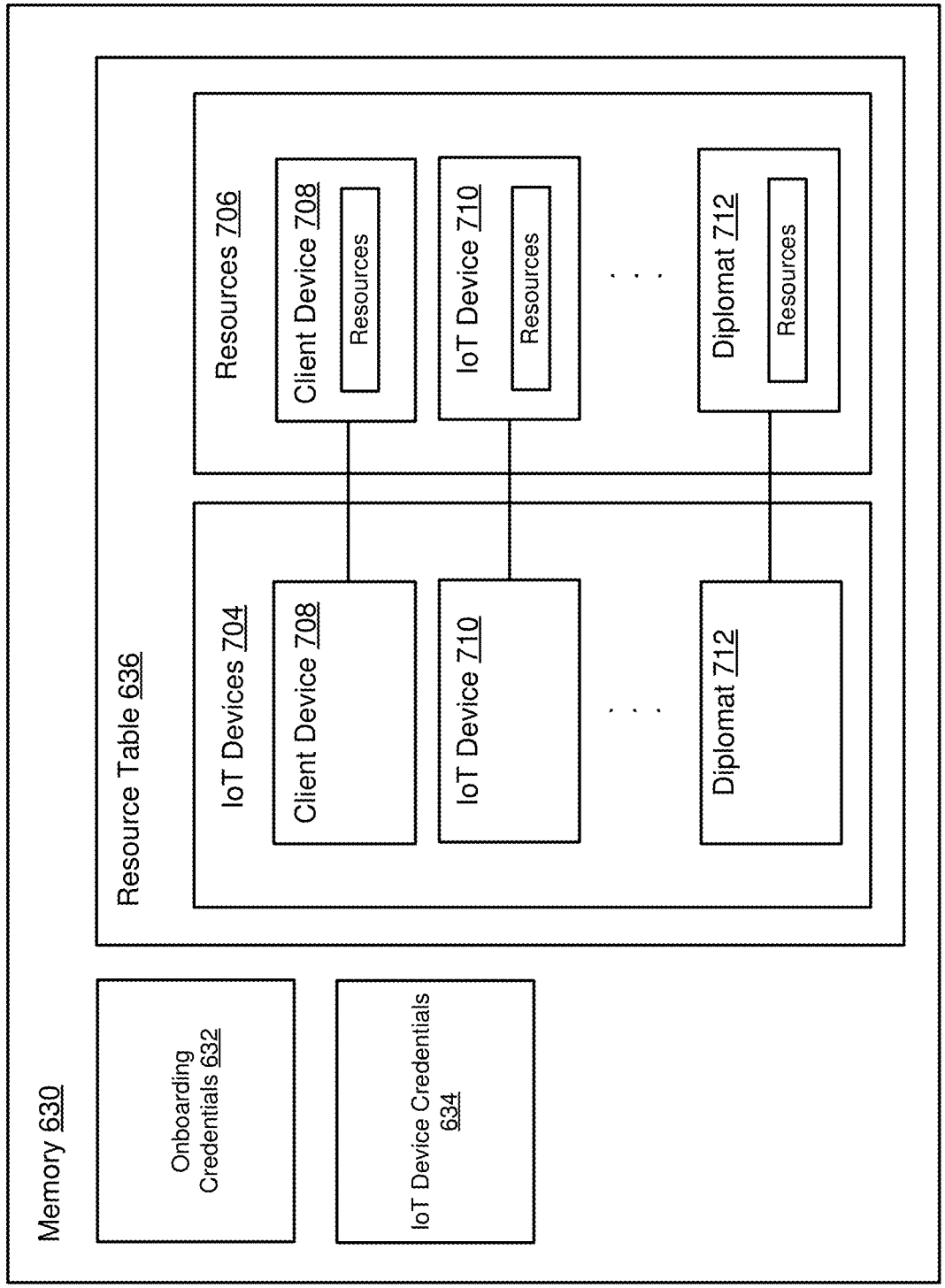
FIG. 7 shows one example memory that includes a resource table for one or more IoT devices and diplomat for a corresponding IoT ecosystem, according to embodiments.

FIG. 7 shows an example memory 630 (e.g., a database within the client device 106, 210, 312, FIGS. 1-3, respectively) that includes the onboarding credentials 632, IoT device credentials 634, and a resource table 636. In some embodiments, memory 630 is located on a remote server accessible by a client device (e.g., client device 106, 210, 312). The resource table 636 may include a list of IoT devices 704 within an IoT ecosystem and the client device 710 diplomat 712, that have been onboarded by the onboarding application, as well as corresponding resources 706 for reach of the IoT devices 710 included within the list of IoT devices. In some embodiments, the diplomat 712, client device 708, and IoT device 710 (e.g., the IoT device 104, after onboarding has occurred) may be included within the list of IoT devices 704. Further, within the resources 706, each IoT device listed, the diplomat 712, client device 708, and the IoT device 710, may include corresponding resources. The resources may include attributes of any of the IoT device, such as the brightness of an IoT lamp, an IoT TV volume, or an IoT recliner position, all shown in FIG. 1. Each of the IoT devices may have many resources stored for one or more attributes of each IoT device within the IoT ecosystem. For example, the volume, brightness, particular channel, etc. for an IoT TV may all be stored within the resource table 636, under the IoT device 710 for the IoT TV. Further, identifiers, including IoT UUID, IoT device credentials, etc. may be stored as resources for each of the IoT devices 710 and the diplomat 712.

Figure 8:
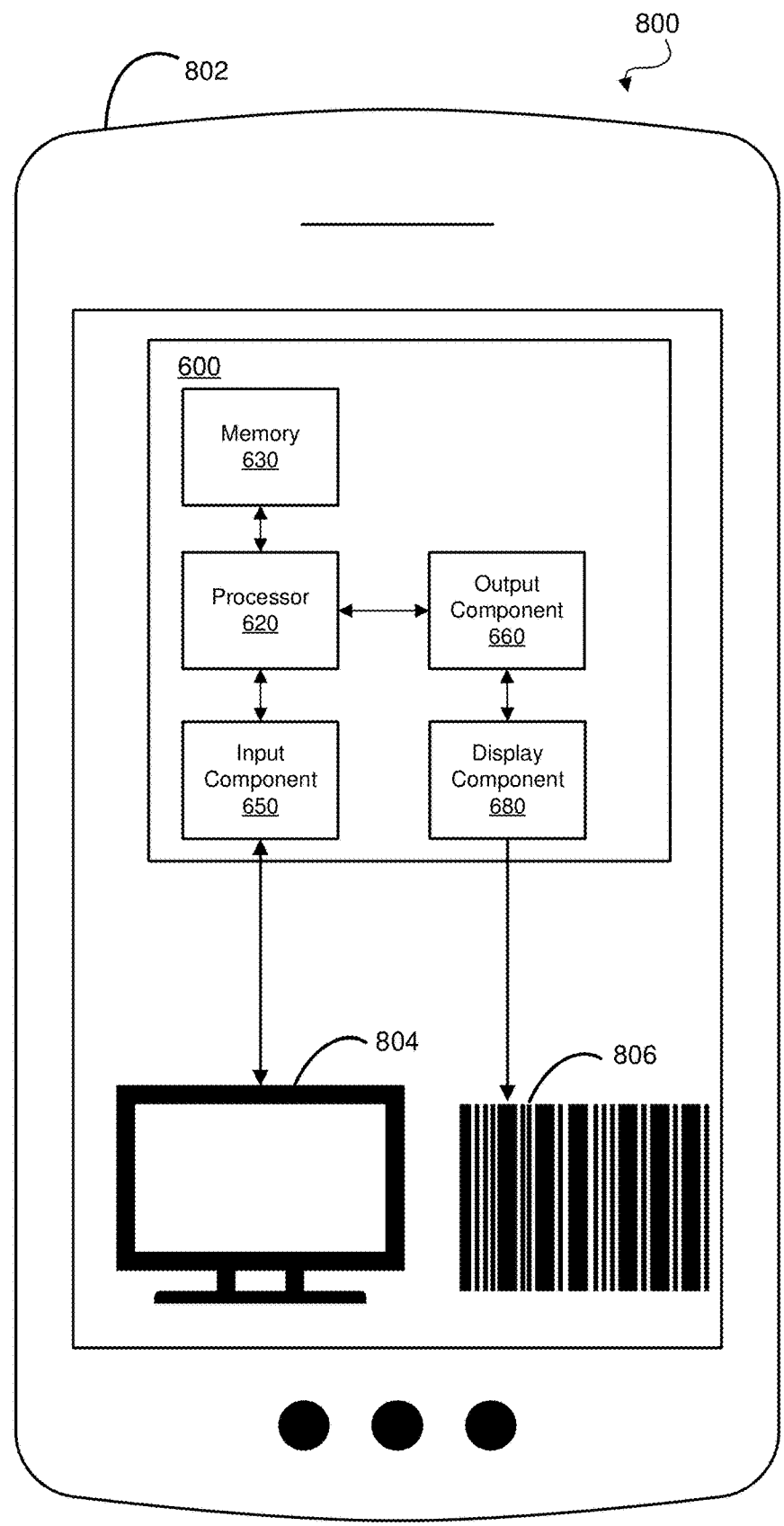
FIG. 8 shows one example computing diagram, including a plurality of computing units from FIG. 6, embedded within a client device, according to embodiments.

FIG. 8 shows exemplary computing units 800 within a client device 802 used to scan an identifier of the IoT device. The client device 802 may include embodiments from the exemplary computing device 600 (described with reference to FIG. 6). In some embodiments, the client device 802 may receive a Bluetooth signal, nearfield communication signal, etc. from the IoT device. The client device 802 may capture a display of an identifier of the IoT device, in the form of a digital image of the identifier 806, along with a digital image of the IoT device 804. In some embodiments, an input component 650, running on a platform (e.g., the client device 106, FIG. 1), may receive the identifier associated with the IoT device 804 and transmit the received identifier to the processor 620. According to instructions stored within memory 630, processor 620 may analyze the identifier 806 and extract the necessary information from the identifier 806, such as the UUID and a public credential hash of the IoT device.

Upon the processor extracting the UUID and the public credential hash of the IoT device, the output component 660 may generate a prompt for the display component 380 to display within the client device 802 whether the user desires to begin an onboarding process for the IoT device to the IoT ecosystem. The client device 802 may receive input, e.g., from a user (e.g., the user 102, FIG. 1), confirm onboarding in the form of an instruction for the client device 802 to transmit the UUID and the public credential hash of the IoT device to router (e.g., the router 110) or to a configurator (e.g., configurator 310) embedded within a router. If the client device has received more than one identifier from more than one IoT devices, in the form of, e.g., a Bluetooth signal and/or a nearfield communication signal, the client device 802 may display more than one IoT devices within the user interface. The client device 802 may then receive a selection of which, or all, of the IoT devices to onboard onto the IoT ecosystem. In some embodiments, the client device 802 may automatically begin the onboarding process by transmitting the UUID and public credential hash of the IoT device to the configurator.

In some embodiments, the computing device 600 may not be running within the client device 802. In some embodiments, the computing device 600, or some components of the computing device 600, may be on a server, on a cloud network, or within various devices of an IoT ecosystem, e.g., within one or more of the IoT devices 104, 112, 114, with reference to FIG. 1. In some embodiments, more than the components shown within FIG. 8 may be running on the client device 802, a server, cloud network, or various devices of an IoT ecosystem. The displayed components are meant as an illustration of one or more embodiments.

Figure 9:
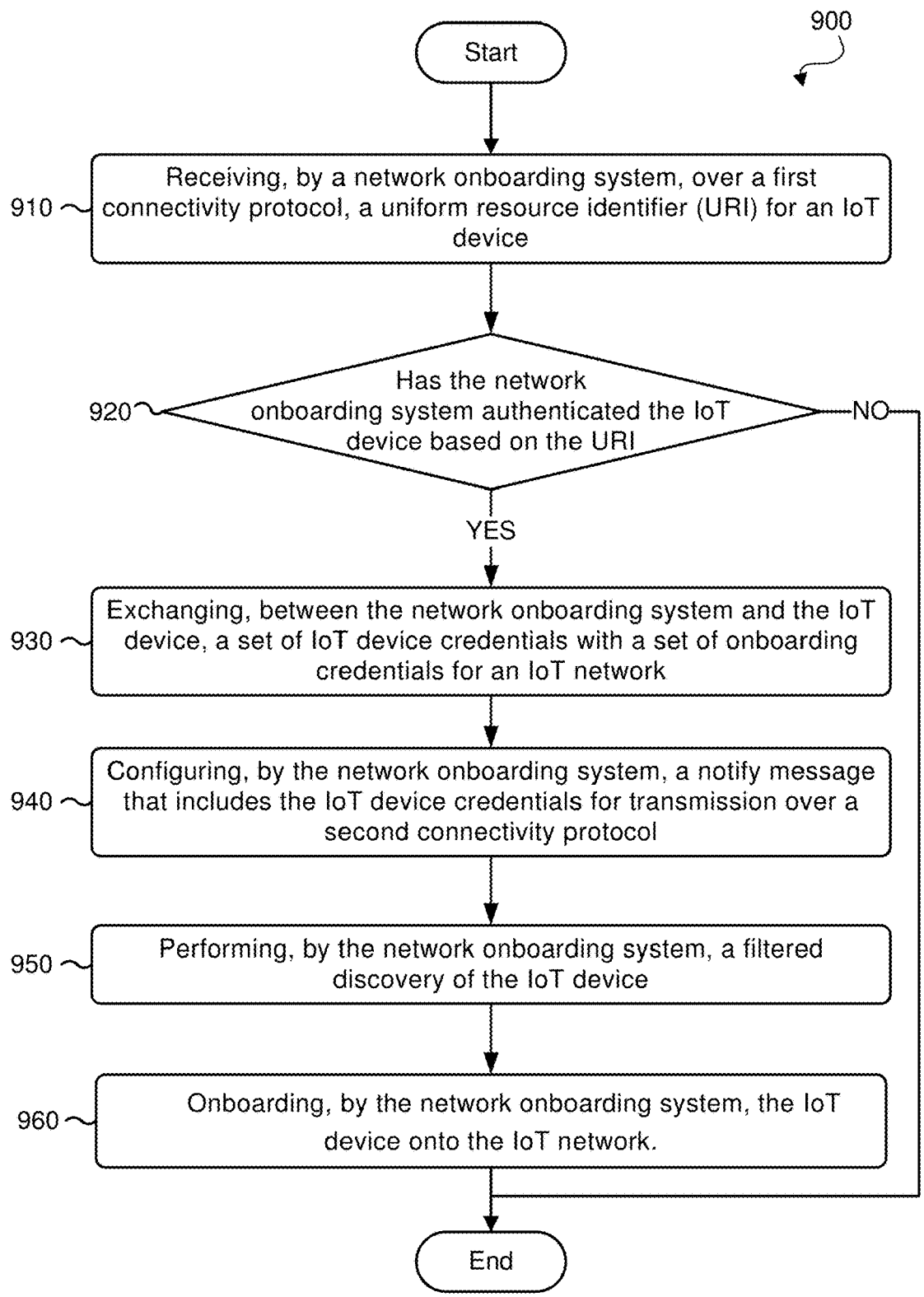
FIG. 9 shows one example method for a network onboarding system dynamically onboarding an IoT device onto an IoT ecosystem, according to embodiments.

FIG. 9 is a flowchart of an example process 900 for onboarding an IoT device (e.g., IoT device 104, 204, 304, FIGS. 1-3) onto an IoT network. In some embodiments, one or more steps of process 900 may be performed by a network onboarding system (e.g., network onboarding system, FIGS. 1, 2, 3). In some embodiments, one or more steps of process 900 may be performed by another device or a group of devices separate from (e.g., the exemplary computing device 600, FIGS. 6, 7, and the client device 106, 210, 312, 802, FIGS. 1-3, 8) or including the network onboarding system.

As shown in FIG. 9, process 900 may include receiving (910) over a first connectivity protocol, a uniform resource identifier (URI) for an IoT device (e.g., the IoT device 104, 204, 304, FIG. 1, 2, 3, respectively). For example, the network onboarding system may receive over a first connectivity protocol, a uniform resource identifier (URI) (e.g., identifier 212, 314, FIG. 2, 3) for an IoT device, as described above. The URI may include an encoded public key of the IoT device. In some embodiments, the first connectivity protocol may include a device provisioning protocol (e.g., based on the Wi-Fi Certified Easy Connect® framework), that provides a process in which IoT devices may be securely associated with the Wi-Fi network in a streamlined fashion. In some embodiments, the first connectivity protocol is an out-of-band channel (e.g., OOB channel 208, FIG. 2), such as a data link protocol (not shown) or device provisioning protocol (e.g., DPP 308, FIG. 3). The process may involve the bootstrapping of trust between the IoT device and a DPP configurator (e.g., the DPP configurator 310, FIG. 3). In some embodiments, the network onboarding system is running on at least one of a client device (e.g., the client device 106, 802, FIGS. 1, 8, respectively), a cloud, and a network.

In some embodiments, the URI may have been transmitted by a client device (e.g., the client device 106, 802). The client device may have captured an identifier by, e.g., scanning a QR code (e.g., the identifier 108, 212, 314, FIG. 1-3) presented by an IoT device (e.g., the IoT device 104), receiving a Bluetooth signal or a nearfield communication signal transmitted by an IoT device, etc., that include the URI. The client device may analyze and extract the URI from the various identifiers and then transmit the URI of the device, which includes a public credential hash and a UUID, over a device provisioning protocol, to a DPP configurator.

As further shown in FIG. 9, process 900 may include determining (920) whether the IoT device has been authenticated, based on the URI. For example, the network onboarding system may authenticate the IoT device based on the URI, as described above. In some embodiments, the DPP configurator may authenticate the IoT device by initiating communication with the IoT device and then checking the UUID and/or the public credential hash of the IoT device. In some embodiments, the IoT device may initiate contact with the DPP configurator to begin the authentication process. This authentication by the DPP configurator of the IoT device may establish a secure layer 2 connection between the DPP configurator and the IoT device for an exchange of messages between the DPP configurator and the IoT device. In some embodiments, either the public credential hash or the UUID may not be authenticated. In this case, either the DPP configurator or the IoT device may attempt to reinitiate authentication for either the public credential hash or the UUID.

However, if the network onboarding system did not authenticate (decision block: "NO") the IoT device based on the URI, the process 900 may end. In some embodiments, if the network onboarding system did not authenticate the IoT device, the network onboarding system may prompt the IoT device for the URI to reinitiate the process of authenticating the IoT device. In some embodiments, the IoT device may reinitiate contact with the DPP configurator to restart the authentication process or the DPP configurator may reinitiate contact with the IoT device to restart the authentication process. In some embodiments, the IoT device 104 may display an error message, within a user interface, that the IoT device was not authenticated, along with a set of instructions to remedy the lack of authentication.

As further shown in FIG. 9, process 900 may include exchanging (930), between the network onboarding system (e.g., onboarding application 202, 302, the diplomat 206, 305, and the OOB 208, DPP 308, FIGS. 2, 3, respectively) and the IoT device, a set of IoT device credentials with a set of onboarding credentials for an IoT network. For example, the network onboarding system may exchange, between the network onboarding system and the IoT device, a set of IoT device credentials with a set of onboarding credentials for an IoT network, as described above. Specifically, the exchange occurs between the DPP configurator and the IoT device. In some embodiments, the IoT device initiates the exchange by transmitting a configuration request message to the DPP configurator over a secure channel between the DPP configurator and the IoT device. The request message may include a configuration request object, which includes information about the Wi-Fi capabilities of the IoT device. In some embodiments, the configurator may process the configuration request object and then provide a configuration response message to the IoT device. The response message includes a DPP configuration object, which includes onboarding credentials that the IoT device may use to associate to the IoT network to begin the onboarding process.

As further shown in FIG. 9, process 900 may include configuring (940) a notify message that includes the IoT device credentials for transmission over a second connectivity protocol. For example, the network onboarding system (e.g., the diplomat 206, 306, FIGS. 2, 3) may configure a notify message that includes the IoT device credentials for transmission over a second connectivity protocol, as described above. In some embodiments, the network onboarding system may include the diplomat (e.g., the diplomat 206, 306, FIGS. 2, 3, respectively) that configures the notify message. As discussed above, the diplomat may communicate over at least two connectivity protocols: the DPP and the IoT network. Thus, the diplomat may communicate with the DPP configurator, providing onboarding credentials for the DPP configurator to provide to the IoT device, and to communicate, with the onboarding application, residing on the IoT network, to provide the onboarding application (e.g., onboarding application 202, 302, FIGS. 2, 3, respectively) with the IoT device credentials, included within the notify message. The onboarding application may have subscribed to the diplomat to receive any updates, such as the notify message, of any actions the diplomat has taken. In some embodiments, the notify message may further be a notification that there is an IoT device ready for onboarding to the IoT network. In some embodiments, the diplomat may be represented as an array of objects and within each object is a device ID and a corresponding public credential. In embodiments, the diplomat may be partially represented in the form of resources stored in a resource table (resource table 636, FIGS. 6, 7) within memory (e.g., memory 630, FIGS. 6, 7).

As further shown in FIG. 9, process 900 may include performing (950) a filtered discovery of the IoT device. For example, the network onboarding system may perform the filtered discovery of the IoT device, as described above in FIG. 4. In some embodiments, the onboarding application may perform the filtered discovery based in part on the IoT device credentials received, from the diplomat, included in the notify message. In some embodiments, the filtered discovery may be narrowed based on the IoT device credentials, such as the IoT device's public credentials hash and the UUID. As further shown in FIG. 9, process 900 may include onboarding (960) the IoT device onto the IoT network. For example, the network onboarding system may onboard the IoT device onto the IoT network, as described above. In some embodiments, the onboarding application performs the onboarding of the IoT device, as discussed in (430)-(438), FIG. 4, which include the ownership transfer method, as discussed in FIG. 5. In some embodiments, onboarding the IoT device onto the IoT network further comprises receiving a confirmation from a client device (e.g., the client device 104, 802, FIGS. 1, 8, respectively) to onboard the IoT device onto the IoT ecosystem.

Process 900 may include additional embodiments, such as any single embodiment or any combination of embodiments described herein. Although FIG. 9 shows example steps of process 900, in some embodiments, process 900 may include additional steps, fewer steps, different steps, or differently arranged steps than those depicted in FIG. 9. Additionally, or alternatively, two or more of the steps of process 900 may be performed in parallel.

Figure 10:
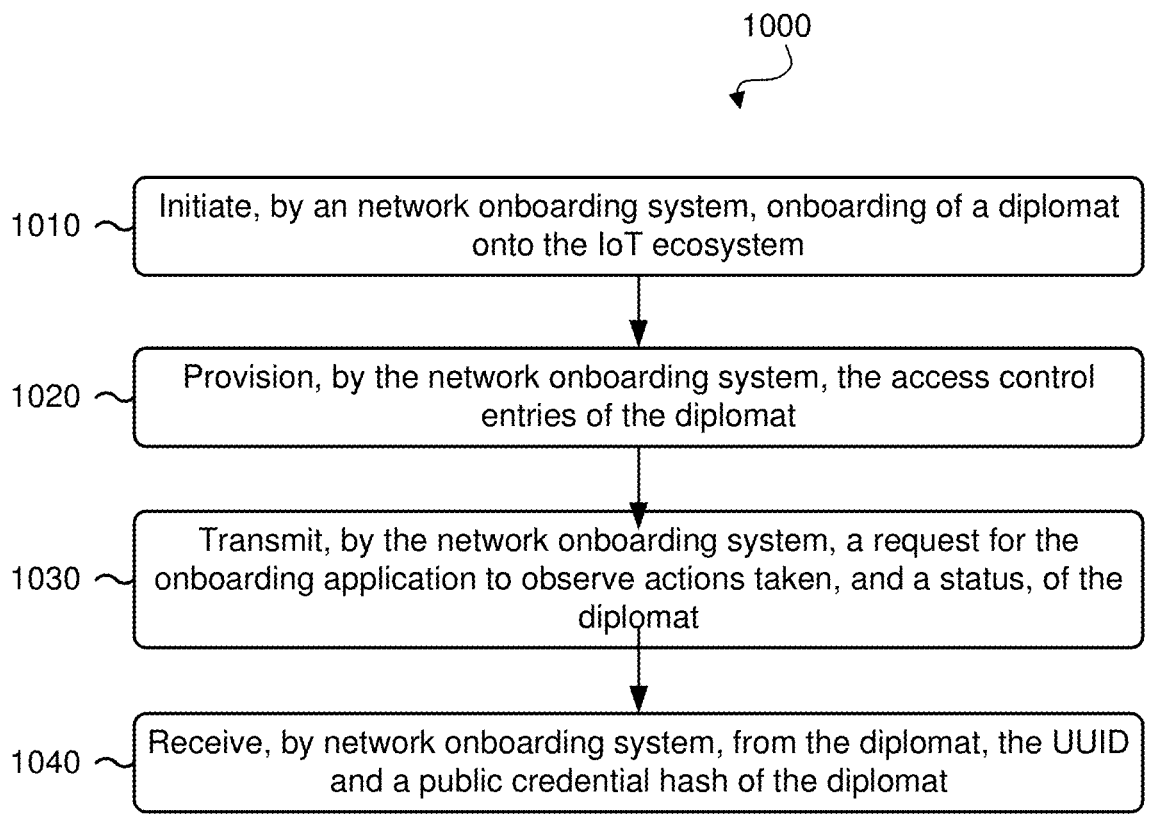
FIG. 10 shows one example method for an onboarding application onboarding, and subscribing to, a diplomat, according to embodiments.

FIG. 10 is a flowchart of an example process 1000 for onboarding a diplomat (e.g., the diplomat 206, 306, FIGS. 2, 3) onto an IoT ecosystem (e.g., the IoT ecosystem 100, FIG. 1) by an onboarding application (e.g., 202, 302, FIGS. 2, 3). In some embodiments, one or more steps of process 1000 may be performed by a network onboarding system (e.g., network onboarding system, FIGS. 1, 2, 3). In some implementations, one or more steps of process 1000 may be performed by another device or a group of devices separate from (e.g., the exemplary computing device 600, FIGS. 6, 7, the memory 630, client device 106, 210, 312, 802, FIGS. 1-3, 8) or including the network onboarding system. In some embodiments, (1010)-(1040) may substantially follow (402)-(408), as discussed in FIG. 4.

As shown in FIG. 10, process 1000 may include interactions between the onboarding application (onboarding application 202, 302, FIGS. 2, 3) and the diplomat (e.g., diplomat 206, 306, FIGS. 2, 3), both of which are included in the network onboarding system. FIG. 10 may include the onboarding application initiating (1010) onboarding of the diplomat onto the IoT ecosystem. As further shown in FIG. 10, process 1000 may include the onboarding application provisioning (1020) the access control entries of the diplomat. For example, the diplomat may be represented within a resource table (e.g., resource table 636, FIGS. 6, 7) as a resource, and the onboarding application may subscribe to the diplomat resource within the resource table. As further shown in FIG. 10, process 1000 may include the onboarding application transmitting (1030) a request for the onboarding application to observe actions taken, and a status, of the diplomat. For example, any actions taken by, or updates to, the resources of the diplomat, within the resource table, may be sent to the onboarding application. As further shown in FIG. 10, process 1000 may include the onboarding application (1040) transmitting the UUID and a public credential hash of the onboarding application to the diplomat to be forwarded, by the diplomat, to the DPP configurator (e.g., the DPP configurator 310, FIG. 3) and used for the exchange between the DPP configurator and the IoT device (e.g., the IoT device 104, 204, 304, FIGS. 1, 2, 3), as discussed in FIGS. 4 and 9. This exchange may be used for mutual authentication between the IoT device and the onboarding application, as discussed in FIGS. 4 and 9.

Figure 11:
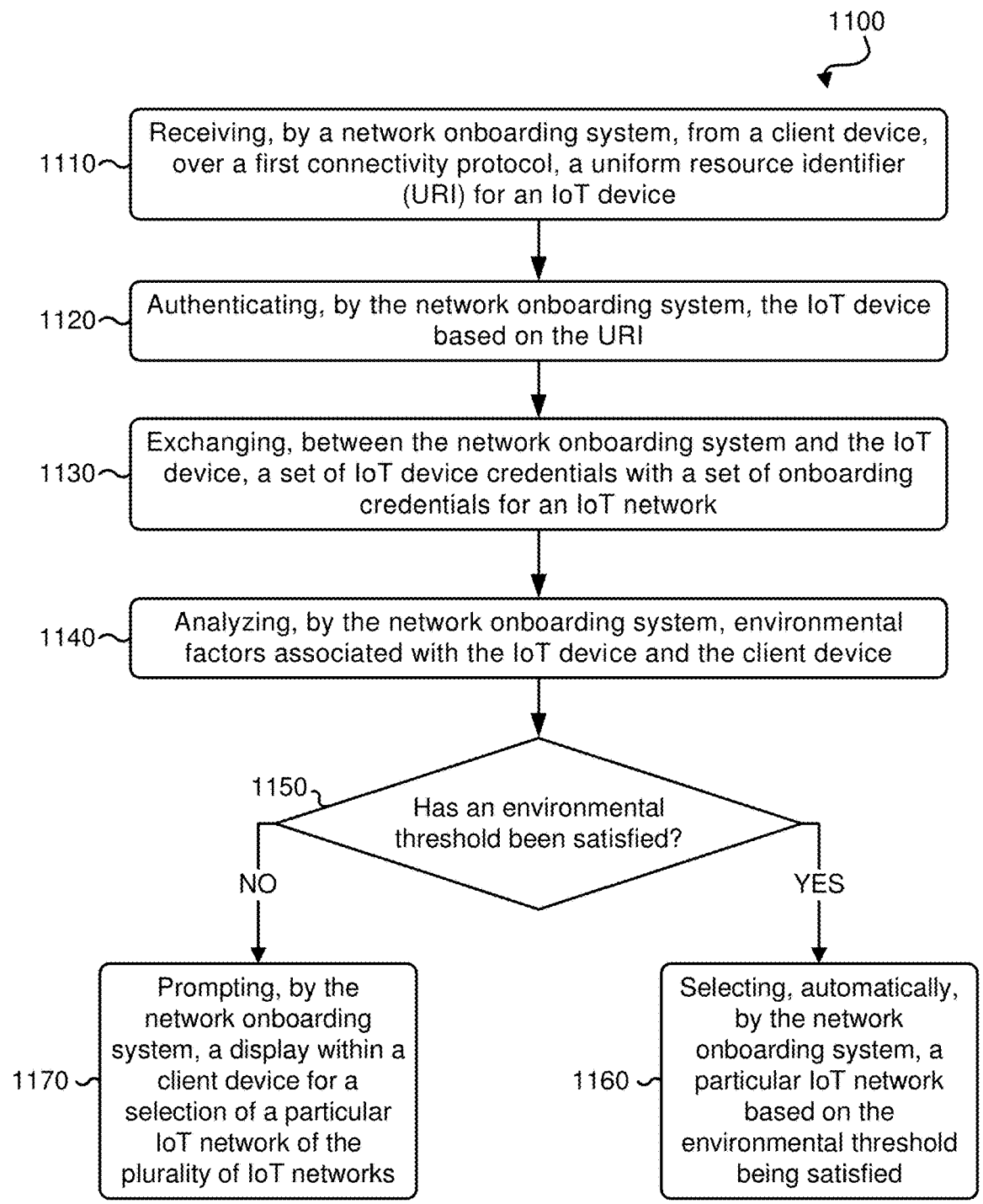
FIG. 11 shows one example method for adding an IoT device to an IoT a particular IoT ecosystem of one or more IoT ecosystems, according to embodiments.

FIG. 11 is a flowchart of an example process 1100 for the network onboarding system (e.g., network onboarding system, FIGS. 1, 2, 3) to select which IoT network of a plurality of IoT networks to onboard an IoT device (e.g., the IoT device 104, 204, 304, FIGS. 1, 2, 3). In some embodiments, one or more steps of process 1100 may be performed by a network onboarding system (e.g., network onboarding system, FIGS. 1, 2, 3). In some implementations, one or more steps of process 1100 may be performed by another device or a group of devices separate from (e.g., the exemplary computing device 600, FIGS. 6, 7, and the memory 630, FIG. 8) or including the network onboarding system.

Steps (1110)-(1130) may be substantially similar to steps (910)-(930) from FIG. 9. However, FIG. 11 may describe an embodiment where there are multiple IoT ecosystems (e.g., the IoT ecosystem 100, FIG. 1, in addition to other at-home IoT ecosystems) and the network onboarding system selects, automatically, or in response to a message from a client device, which IoT ecosystem the IoT device may be onboarded. This does not limit FIG. 9 to only one IoT ecosystem (e.g., IoT ecosystem 100, FIG. 1); FIG. 9 may have one or more ecosystems. In some embodiments, each IoT ecosystem has a corresponding IoT network, e.g., an at-home IoT ecosystem has an at-home IoT network, a work IoT ecosystem has a work IoT network, etc. In embodiments, each of the IoT networks is associated with a client device (e.g., the client device 106, 312, FIGS. 1, 3) or each IoT network is associated with a corresponding client device.

As shown in FIG. 11, process 1100 may include a network onboarding system receiving (1110), over a first connectivity protocol, by a client device, a uniform resource identifier (URI) for an IoT device. As further shown in FIG. 11, process 1100 may include the network onboarding system authenticating (1120) the IoT device based on the URI. As further shown in FIG. 11, process 1100 may include the network onboarding system exchanging (1130) a set of IT device credentials with a set of onboarding credentials for the IoT network.

As further shown in FIG. 11, process 1100 may include the network onboarding system analyzing (1140) environmental factors associated with the IoT device and the client device. For example, the environmental factors may include the MAC address of the client device, which IoT ecosystem the client device is associated with of the plurality of IoT ecosystems (e.g., by referencing the resource table 636), identifying which particular IoT devices are included in each IoT ecosystem to determine if there would be a redundancy if the IoT device was added to one of the IoT ecosystems (e.g., an IoT sound system is already included in a particular IoT ecosystem and the IoT device to be onboarded is an IoT sound system), etc. In some embodiments, the client device may transmit a request to onboard the IoT device to a particular IoT ecosystem or the network onboarding system may request, from the client device, which IoT ecosystem to onboard the IoT device.

As further shown in FIG. 11, process 1100 may include determining (1150), based on analyzing the environmental factors, the environmental factors satisfy an environmental threshold. In some embodiments, a single factor may be dispositive for determining a particular IoT network to onboard the IoT device. For example, the network onboarding system may determine that one factor: a request, from the client device, to onboard the IoT device to a particular IoT ecosystem, is dispositive and, therefore, satisfies the environmental threshold. In some embodiments, the environmental threshold may include a minimum number of factors that weigh in favor of selecting a particular IT network of the plurality of IoT networks. For example, out of ten environmental factors, the minimum number may be any number, including 5, 6, etc. The minimum number may also be the number when a majority of factors point towards a particular IoT network. For example, if there are three IoT networks: Network A, Network B, and Network C. If Network A has five factors weighing in favor, Network B has three, and Network C has two, Network A would be the IoT network that the network onboarding system onboards the IoT device.

In some embodiments, the network onboarding system may compare the environmental factors to predetermined environmental factors and, if the difference between the environmental factors and the predetermined environmental factors is greater or equal to a numerical value, the environmental threshold may be satisfied. For example, if there are three environmental factors weighing in favor of a particular IoT network, those environmental factors may be compared to predetermined environmental factors that include five environmental factors, two of which mirror environmental factors that weigh in favor of the particular IoT network. If the environmental threshold is two environmental factors, the network onboarding system may determine that the environmental threshold is satisfied. For example, the environmental factors weighing in favor of a particular IoT network may include the MAC address of the client device is associated with the particular IT network and that the IoT ecosystem associated with the client device does not include a similar IoT device as the particular IoT device, while other IoT ecosystems include a similar IoT device. If these two environmental factors match corresponding environmental factors from a predetermined environmental factor list, then the network onboarding device may select to onboard the IoT device to the particular IoT network.

Once the network onboarding system has determined the environmental threshold has been satisfied for a particular IoT network (decision step: "YES"), the process 1100 may automatically (1160) select a particular IoT network to onboard the IoT device. In some embodiments, network onboarding system may begin configuring the notification message that includes the IoT device credentials for transmission over the second connectivity protocol, as outlined in step 940 (FIG. 9). In some embodiments, the network onboarding system may transmit a request, to the client device, for approval that the selected IoT network is the correct IoT network. In some examples, the request may expire after a time interval, such as five minutes, an hour, etc. In some embodiments, the user may customize how the network onboarding system selects a particular IoT network, which may include any of the above examples of satisfying the environmental threshold or an option to bypass determining whether the environmental threshold is satisfied and send a request immediately to the client device, for approval by the user.

However, if the environmental threshold has not been satisfied for a particular IoT network (decision step: "NO"), the network onboarding system may prompt (1170) a request, in the form of a display, within the client device, that includes a list of available IoT networks to onboard the IoT device, for a user to select which IoT network of the plurality of IoT networks to onboard the IoT device. In some embodiments, the IoT device may be onboarded to all or more than one IoT ecosystem. In some embodiments, the request may include an option for a user to input a different IoT network not included within the list of available IoT networks. The request may further include additional features for an authorized user of the client device to select a particular IoT network to be associated with the client device, so that satisfying the environmental threshold is not required for future onboarding of IoT devices.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method, comprising:
    receiving, by a diplomat, over a first connectivity protocol, from an onboarding application, a set of onboarding credentials for mutual authentication between an IoT (Internet of Things) device and an onboarding application;
    transmitting, by the diplomat, over a second connectivity protocol, the onboarding credentials destined for the IoT device;
    receiving, by the diplomat, over the second connectivity protocol, IoT device credentials of the IoT device for mutual authentication between the IoT device and the onboarding application; and
    wherein the onboarding credentials includes a public credential hash and a universal unique identifier of the onboarding application, and the IoT device credentials includes a credential hash and a universal unique identifier of the IoT device; and
    forwarding, by the diplomat, over the first connectivity protocol, the IoT device credentials to the onboarding application.

2. A method, comprising:
    receiving, by a configurator, onboarding credentials of an onboarding application, over a first connectivity protocol, from a diplomat;
    receiving, by the configurator, a signal, from a client device, to begin initiation of onboarding an IoT (Internet of things) device onto an IoT (Internet of things) ecosystem;
    providing, by the configurator, the onboarding credentials to the IoT device;
    receiving, by the configurator, from the IoT device or the client device, IoT device credentials; and
    transmitting, by the configurator, the IoT device credentials to the diplomat, destined for transmission, over a second connectivity protocol, to the onboarding application
    wherein the onboarding credentials includes a public credential hash and a universal unique identifier of the onboarding application, and the IoT device credentials includes a credential hash and a universal unique identifier of the IoT device.

3. The method of claim 2, the IoT device credentials received from the client device and obtained by the client device capturing an identifier of the IoT device.

4. The method of claim 2, further comprising initiating a provisioning exchange between the configurator and the IoT device to associate the IoT device with a configurator network.

5. The method of claim 4, further comprising, during the provisioning exchange, receiving from the IoT device and at the configurator, IoT ecosystem credential information of the IoT Device.

6. The method of claim 2, wherein the first connectivity protocol is an out-of-band channel.

7. The method of claim 2, wherein the second connectivity protocol is one or of Wi-Fi, Bluetooth, or cellular.

8. The method of claim 4, further comprising onboarding the diplomat into an IoT ecosystem.

9. The method of claim 8, the onboarding the diplomat including provisioning an access control entity specifying that an onboarding application may read a diplomat resource.

10. The method of claim 9, wherein the diplomat resource is one or more of a status, or actions taken by, an IoT device, diplomat, and list of software or hardware device included within the IoT ecosystem.

11. The method of claim 4, further comprising:
    receiving at the diplomat and from the onboarding application, a request to subscribe the onboarding application to the diplomat; and,
    providing, to a configurator and from the diplomat, a universal unique identifier (UUID) and public credential hash of the onboarding application.

12. The method of claim 4, the forwarding, by the diplomat, over the first connectivity protocol, the IoT device credentials to the onboarding application including transmitting a notify message indicating that the IoT device is requesting to join an IoT ecosystem associated with the onboarding application.

13. The method of claim 4, wherein the first connectivity protocol is an out-of-band channel.

14. The method of claim 4, wherein the second connectivity protocol is one or of Wi-Fi, Bluetooth, or cellular.

15. A system, comprising: a processor, and memory storing computer readable instructions that when executed by the processor cause the system to:
    receive, over a first connectivity protocol, from an onboarding application, a set of onboarding credentials for mutual authentication between an IoT (Internet of things) device and an onboarding application,
    transmit, over a second connectivity protocol, the onboarding credentials destined for the IoT device;
    receive, over the second connectivity protocol, IoT device credentials of the IoT device for mutual authentication between the IoT device and the onboarding application; and
    wherein the onboarding credentials includes a public credential hash and a universal unique identifier of the onboarding application, and the IoT device credentials includes a credential hash and a universal unique identifier of the IoT device, and
    forward, over the first connectivity protocol, the IoT device credentials to the onboarding application.

16. The system of claim 15, the memory storing further computer readable instructions that, when executed by the processor, further cause the system to:
    provision an access control entity specifying that an onboarding application may read a diplomat resource.

17. The system of claim 16, wherein the diplomat resource is one or more of a status, or actions taken by, an IoT device, diplomat, and list of software or hardware device included within an IoT ecosystem.

\* \* \* \* \*